United States Patent
Subramani Nadar et al.

(10) Patent No.: US 10,382,291 B2
(45) Date of Patent: Aug. 13, 2019

(54) PROVISIONING FRAMEWORK FOR BINDING RELATED CLOUD SERVICES

(71) Applicant: Oracle International Corporation, Redwood Shores, CA (US)

(72) Inventors: Velmurugan Subramani Nadar, Mountain House, CA (US); Nilesh P. Junnarkar, Palo Alto, CA (US); Divyang Dalal, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 198 days.

(21) Appl. No.: 15/498,294

(22) Filed: Apr. 26, 2017

(65) Prior Publication Data

US 2018/0316552 A1    Nov. 1, 2018

(51) Int. Cl.
*H04L 12/24* (2006.01)
*H04L 29/08* (2006.01)
*G06F 9/50* (2006.01)

(52) U.S. Cl.
CPC ........ *H04L 41/5054* (2013.01); *G06F 9/5055* (2013.01); *G06F 9/5066* (2013.01); *G06F 9/5072* (2013.01); *H04L 41/0654* (2013.01); *H04L 41/0803* (2013.01); *H04L 41/5045* (2013.01); *H04L 67/10* (2013.01); *H04L 41/5096* (2013.01)

(58) Field of Classification Search
CPC ............. H04L 41/5054; H04L 41/0654; H04L 41/0803; H04L 41/5045; H04L 67/10; H04L 41/5096; G06F 9/5072; G06F 9/5066; G06F 9/5055
See application file for complete search history.

(56) References Cited

U.S. PATENT DOCUMENTS

| | | | |
|---|---|---|---|
| 6,778,525 B1* | 8/2004 | Baum | H04L 47/2408 370/252 |
| 8,959,229 B1* | 2/2015 | Grasselt | H04L 47/72 709/226 |
| 9,250,887 B2* | 2/2016 | Lucovsky | G06F 9/45533 |
| 9,250,974 B1 | 2/2016 | Estes et al. | |
| 9,832,205 B2* | 11/2017 | Santhi | H04L 41/5054 |
| 10,225,140 B2* | 3/2019 | Subramani Nadar | H04L 41/0803 |
| 2011/0265164 A1* | 10/2011 | Lucovsky | G06F 9/5055 726/7 |
| 2011/0265168 A1* | 10/2011 | Lucovsky | H04L 63/083 726/7 |
| 2012/0060165 A1 | 3/2012 | Clarke | |

(Continued)

*Primary Examiner* — Ramy M Osman
(74) *Attorney, Agent, or Firm* — Invoke

(57) ABSTRACT

Techniques are described for binding secondary services with a cloud service instance. In one or more embodiments, a service definition defines a set of secondary services that are compatible with a primary service. In response to receiving a request to perform a provisioning operation for the instance of the primary service, a provisioning engine identifies, from the set of secondary services that are compatible with the primary service, a subset of one or more secondary services that are available. The provisioning engine binds the subset of one or more secondary services to the primary service to generate a deployment configuration for the instance of the primary service. Based on the deployment configuration, the provisioning engine provisions a set of components for the instance of the primary service.

20 Claims, 10 Drawing Sheets

(56) References Cited

U.S. PATENT DOCUMENTS

| | | | |
|---|---|---|---|
| 2013/0031559 A1* | 1/2013 | Alicherry | G06F 9/5066 718/104 |
| 2013/0185431 A1* | 7/2013 | Venkatesh | G06F 9/5072 709/226 |
| 2014/0052867 A1* | 2/2014 | Lucovsky | H04L 41/0893 709/226 |
| 2014/0074647 A1* | 3/2014 | Mukherjee | G06Q 30/06 705/26.7 |
| 2015/0058459 A1 | 2/2015 | Amendjian et al. | |
| 2015/0067171 A1* | 3/2015 | Yum | H04L 67/2809 709/226 |
| 2015/0154293 A1* | 6/2015 | Lu | G06F 9/485 707/770 |
| 2016/0043970 A1* | 2/2016 | Jacob | H04L 47/828 709/226 |
| 2016/0065417 A1* | 3/2016 | Sapuram | H04L 41/50 709/223 |
| 2016/0094483 A1 | 3/2016 | Johnston et al. | |
| 2016/0337175 A1* | 11/2016 | Rao | H04L 41/5025 |
| 2016/0381151 A1* | 12/2016 | Apte | H04L 67/16 709/202 |
| 2017/0243263 A1* | 8/2017 | Vedala | G06Q 20/14 |
| 2017/0244593 A1* | 8/2017 | Rangasamy | H04L 41/0654 |
| 2018/0316551 A1* | 11/2018 | Subramani Nadar | H04L 41/0803 |
| 2018/0316552 A1* | 11/2018 | Subramani Nadar | H04L 41/0803 |

* cited by examiner

PROVISIONING FRAMEWORK FOR BINDING RELATED CLOUD SERVICES

RELATED CASES

This application is related to U.S. patent application Ser. No. 15/498,184, entitled "PORTABLE INSTANCE PROVISIONING FRAMEWORK FOR CLOUD SERVICES", filed Apr. 26, 2017.

TECHNICAL FIELD

The present disclosure relates, generally, to cloud computing environments. In particular, the present disclosure relates to performing provisioning operations for instances of a cloud service.

BACKGROUND

Cloud computing involves the use of hardware and software resources to provide services over a network. In many cloud computing models, the responsibility of providing and maintaining the hardware and software infrastructure falls on the cloud service provider. By shifting these responsibilities to the cloud service provider, organizations and other consumers may quickly access complex systems and applications without incurring the upfront costs of acquiring the supporting infrastructure. Another benefit of cloud computing is that resources may be shared by multiple tenants, which improves scalability and reduces the costs of the underlying infrastructure.

Cloud provisioning refers to the allocation of cloud computing resources to tenants. Cloud service providers may perform provisioning operations to allocate resources for new tenants of a cloud service, reallocate resources for current tenants, and/or deallocate resources for previous tenants. Cloud resources may be allocated/deallocated in real-time to support tenant requests on an as-needed basis and/or may be allocated based on a pre-defined amount prior to a tenant accessing a cloud service.

Cloud provisioning operations are often defined through complex programs written by cloud administrators. Creating provisioning applications may be a difficult and error-prone process. Inefficient provisioning may have significant consequences to the tenant and/or providers of a cloud service. For example, allocating too few resources to a tenant may lead to resource overload, causing performance degradation. Conversely, allocating too many resources may lead to waste, decreasing the number of tenants that are able to share a resource and increasing costs.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
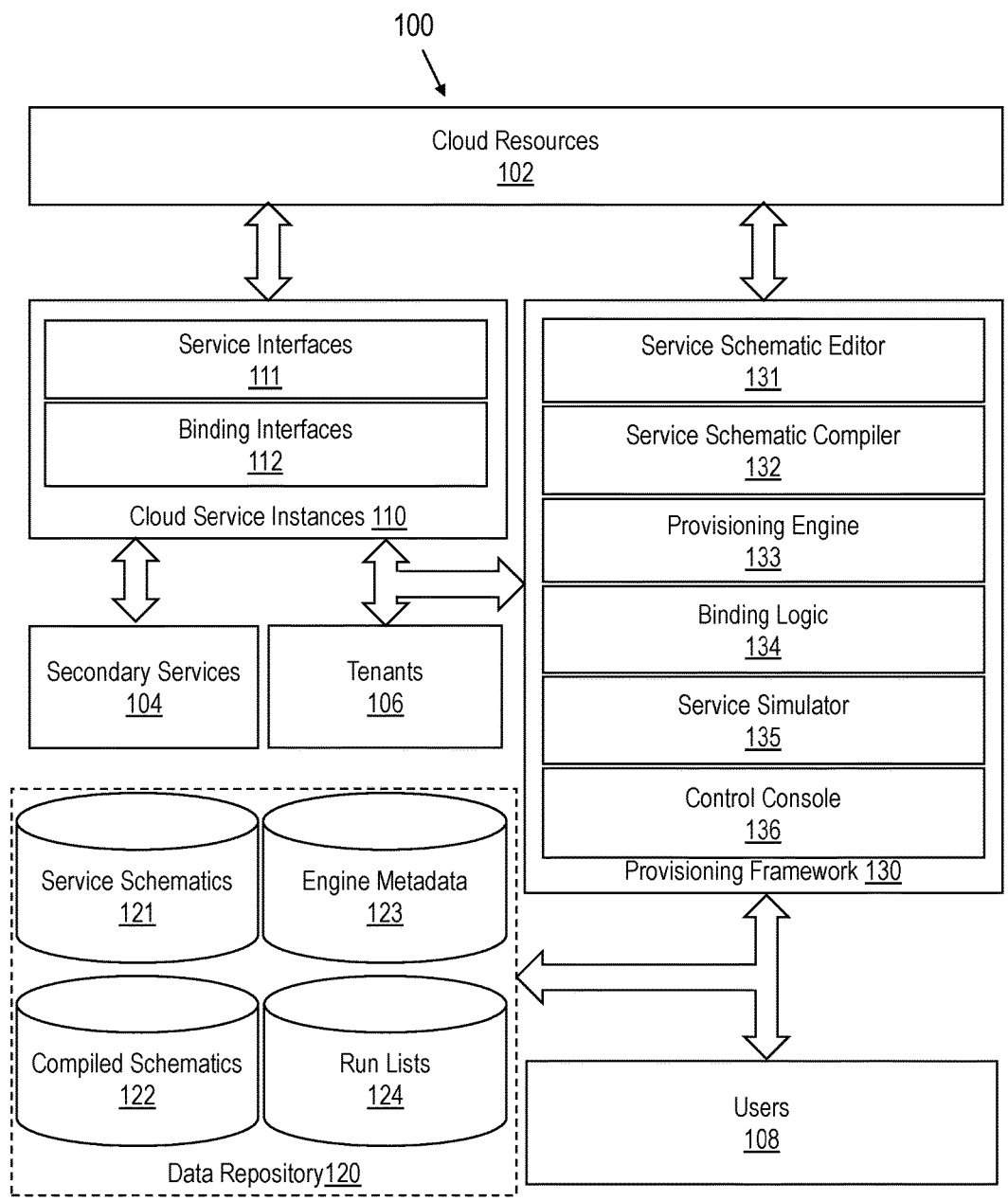
FIG. 1 illustrates a system including a provisioning framework for cloud services in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. SERVICE SCHEMATIC DEFINITIONS
4. SERVICE SCHEMATIC COMPILATION
5. VERSION AGGREGATION
6. SCHEMATIC-BASED PROVISIONING
7. SECONDARY SERVICE BINDING
8. SERVICE SIMULATION
9. HARDWARE OVERVIEW
10. MISCELLANEOUS; EXTENSIONS

1. GENERAL OVERVIEW

Many cloud services rely on the ability to rapidly provision cloud resources. However, provisioning operations may be complicated both by frequent changes to the cloud service offering and/or the underlying cloud infrastructure used to support the cloud service offering. For example, a cloud provider may change security policies, storage solutions, or otherwise modify the components associated with a cloud service. Additionally or alternatively, a cloud provider may adjust the amount of storage, available bandwidth, or other terms of service per tenant. Adding to the complexity, new hardware and software components may be frequently added to and/or removed from the cloud environment.

One approach to implementing cloud provisioning is to hardcode a set of operations that allocate or deallocate resources within the cloud environment. Hardcoding is a direct approach to implementing provisioning operations within the cloud environment. However, this approach lacks flexibility to quickly accommodate changes to a cloud service offering. If a cloud service is upgraded or otherwise modified (e.g., by updating components associated with the cloud service), then a cloud administrator may be required to update the underlying source code for each provisioning operation. As previously indicated, this process may be cumbersome and prone to error. In addition, the cloud administrator updating the service may not have the technical know-how to make the corresponding changes to the hardcoded operations.

Hardcoding also reduces the portability of a provisioning framework. With hardcoded operations, cloud administrators may not be able to directly run a cloud a provisioning flow in a new environment unless the new environment closely matches the native cloud environment in which the cloud provisioning operations were developed. Thus, porting instances of a cloud service to new environments may require updates to the underlying source code for each provisioning operation to account for differences in the new environment.

Techniques described herein provide a provisioning framework through which cloud services may be flexibly defined, updated, and deployed. In one or more embodiments, the provisioning framework defines cloud services using service schematics. A service schematic represents a blueprint for one or more versions of a cloud service. A service schematic may define a cloud service in a manner that is decoupled from environment-specific parameters, which may vary between different cloud environments. For example, operating systems, storage servers, and/or other cloud resources may vary between different environments on which different instances of the cloud service may be deployed. The same service schematic may be portable despite the differences and may be used to provision instances of a cloud service in different environments.

While a cloud service may be implemented in a variety of different environments, a cloud service may depend on the availability of certain cloud resources. For example, a cloud service may rely on certain applications, web services, and/or other components to satisfy an expected type and/or quality of service. In one or more embodiments, resource dependencies are captured by service schematics. During provisioning, resources are allocated based, in part on the resource dependencies defined in the service schematic. If the schematic indicates that the cloud resource is dependent on a particular application, for instance, then an instance of the application may be assigned to a particular tenant to handle incoming requests. Additionally or alternatively, other types of resources may be provisioned for an instance of the cloud service in accordance with the service schematic.

In one or more embodiments, a service schematic defines associations for one or more versions of a cloud service. An association in this context refers to a relationship between the cloud service that is the subject of the service blueprint (herein referred to as the "primary service") and another cloud service (herein referred to as a "secondary service"). The service schematic may associate the primary cloud service with one or more secondary services. For example, a platform as a service (PaaS) may be compatible with other cloud services, including, but not limited to, software as a service (SaaS), middleware as a service (MWaaS), and/or database as a service (DBaaS) instances. During provisioning, resources may be allocated based on the availability of the secondary services. If a secondary service is available, then a provisioning engine may bind the secondary service to the primary service such that the secondary service is integrated into an instance of the primary service. If the secondary service is unavailable (e.g., the tenant has not subscribed or otherwise does not have access to the secondary service), then the provisioning engine may proceed without binding the secondary service. In some cases, the provisioning engine may allocate a default set of components in place of the secondary service if unavailable. In other cases, the provisioning engine may proceed with provisioning an instance of the primary service without allocating any additional resources in place of the secondary service.

Service schematics may define multiple versions of a cloud service. For example, a service schematic may define a base version of a cloud service that includes a base set of resource dependencies and/or associations. The service schematic may further define additional versions (herein referred to as "derived versions") of the service with different resource dependencies and/or associations. A derived version may (a) add, (b) replace, and/or (c) otherwise modify resource dependencies and/or associations of other versions of the cloud service, including the base version and other derived versions.

In one or more embodiments, derived versions of a cloud service are defined as a function of the base version and/or one or more other derived versions. As previously mentioned, a derived version of the cloud service may add to, replace, or otherwise modify other versions of a cloud service. A provisioning engine may aggregate the modifications based on the version of the service for which resources are being allocated. For instance, a service schematic may define a base version of a cloud service that includes a base set of resource dependencies, a first derived version that modifies the base set of resource dependencies, and a second derived version that modifies the preceding derived versions set of resource dependencies. To provision an instance of the first derived version of the cloud service, a provisioning engine may determine a target set of resource dependencies based on the changes made to the base set of resource dependencies by the first derived version of the cloud service. To provision an instance of the second derived version of the cloud service, the provisioning engine may determine a target set of resource dependencies by aggregating the changes made by the first and second derived versions of the cloud service. If the service schematic defines other version of the cloud service, the provisioning engine may similarly determine how to allocate resources as a function of all preceding versions of the cloud service. This structure allows cloud administrators to define updates incrementally within a service schematic without having to redefine the entire cloud service each time a new version is released or a change is made.

In one or more embodiments, the provisioning framework includes a service schematic compiler. Once a service schematic for a cloud service has been defined, the service schematic compiler translates the schematic into a set of instructions for provisioning an instance of the cloud service. The set of instructions may include, but are not limited to, CRUD instructions for creating, reading, updating, and deleting configuration data to allocate resources to a tenant. CRUD instructions may be run in different cloud environment that support the resource dependencies defined in the service schematic. In the event the service schematic is updated (e.g., to add a new version of the cloud service), the service schematic may be recompiled to update the set of provisioning instructions. The service schematic compiler allows cloud administrators to define and change cloud services without having to perform difficult coding/recoding of provisioning operations in different development environments.

2. ARCHITECTURAL OVERVIEW

In one or more embodiments, a provisioning framework comprises logic for allocating resources within a cloud environment. A "cloud environment" or "cloud service platform", as used herein, may include, but is not limited to a set of deployed hardware and/or software resources used to provide a software-as-a-service (SaaS), a database-as-a-service (DBaaS), a platform-as-a-service (PaaS), an infrastructure as a service (IaaS), or any other cloud computing service for one or more tenants. The term "logic" as used herein includes computer or electrical hardware component(s), firmware, a non-transitory computer readable medium that stores instructions, and/or combinations of these components configured to perform one or more functions or actions, and/or to cause one or more functions or actions from another logic, method, and/or system. Logic may include a microprocessor controlled by executable code, a discreet logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logic units are described, it may be possible to incorporate the multiple logic units into one physical logic component. Similarly, where a single logic unit is described, it may be possible to distribute the single logic unit between multiple physical logic components.

In one or more embodiments, the cloud environment comprises a multi-tenant architecture where tenants share hardware resources and/or software resources. For example, a multi-tenant instance of an PaaS may allow hundreds or thousands of tenants to develop and manage applications in the cloud sharing the same cloud infrastructure. As another example, a multi-tenant DBaaS may allow multiple tenants to share an instance of a database application, a database schema, and/or another database resource. Similarly, the SaaS layer may support multiple tenants using a single instance of a software application. In some cases, a multi-tenant architecture may provide shared resources at one layer but not at another layer. For example, a cloud service platform may provide a multi-tenant PaaS, but only a single tenant DBaaS. As another example, the cloud service platform may provide a multi-tenant DBaaS, but only a single tenant SaaS. Thus, the multi-tenant architecture of the cloud service platform may vary depending on the particular implementation.

A tenant may correspond to a single user or a group of users of a cloud service. A "user" in this context may be a human user or a separate application or service. For example, a tenant may correspond to an enterprise or a department within an enterprise that subscribes to a cloud service on behalf of a group of users that are employed or otherwise associated with an enterprise. As another example, a tenant of a cloud service, such as a DBaaS, may be an application that accesses the cloud service to extend the application's functionality.

Tenants may access one or more cloud services using a set of authentication credentials. The cloud service platform may attach different permissions to different tenants/authentication credentials to preserve tenant anonymity within the cloud. As an example, an identity and access management (IAM) policy may define what actions are allowed by a tenant, what resources the tenant is allowed to access, and the effects of a tenant's request to access a resource. If the tenant attempts to perform an unauthorized action and/or attempts to access an unauthorized resource, the request is denied. The policies may be defined to prevent a tenant from knowing what other tenants are accessing cloud targets within the multi-tenant cloud platform.

FIG. 1 illustrates a system including a provisioning framework for cloud services in accordance with one or more embodiments. System 100 generally comprises cloud resources 102, cloud service instances 110, data repository 120, and provisioning framework 130. Components of system 100 may be implemented in software and/or hardware. Each component may be distributed over multiple applications and/or machines. Multiple components may be combined into one application and/or machine. Operations described with respect to one component may instead be performed by another component.

Cloud resources 102 represent cloud computing infrastructure that may be provisioned to provide a cloud service (e.g., a PaaS, SaaS, etc.) to one or more tenants (e.g., tenants 106). Cloud resources 102 may include hardware, software, and/or other cloud services. Cloud resources 102 may be deployed within a public cloud environment and/or a private cloud environment, depending on the particular implementation. As an example, a SaaS application may be installed locally within a private enterprise network that belongs to a tenant. The SaaS application may be connected to a public cloud environment to receive updates as they are released by the SaaS provider. Alternatively, the SaaS application may reside on a network host within a public cloud. The tenant may access the SaaS application using a web browser or some other application.

Cloud resources 102 may comprise agents to track the underlying hardware and software resources in the cloud environment. For instance, an agent process may be executed on a cloud target if the cloud target is a virtual or physical machine, on the same host machine as a cloud target if the cloud target is a software resource, or remotely from the cloud target depending on the particular implementation. An agent process may collect various parameters associated with a cloud target including, but not limited to, information about the operations being executed on or for a cloud target, information about the tenants for which the cloud target is available, information about tenants currently assigned to the cloud target, performance metrics (e.g., memory bandwidth, central processing unit (CPU) bandwidth, active sessions, etc.) for the cloud target, and topology information that identifies dependencies between cloud targets.

Cloud service instances 110 represent instances of a PaaS, SaaS, DBaaS, and/or other cloud service that are provided using cloud resources 102. Cloud service instances 110 include service interfaces 111 and binding interfaces 112. A service interface represents an interface through which tenants 106 may access respective instances of a cloud service. In the context of a PaaS, for instance, a service interface may allow a tenant to develop, upload, and manage applications into the cloud environment. In the context of a DBaaS, the service interface may allow a tenant to create, upload, and query relational database records. As another example, an SaaS interface may allow the user to access application-specific features. Thus, the service interface may vary from implementation to implementation. A service interface may include, but is not limited to, a web/service portal, a graphical user interface (GUI), and an application programming interface (API).

Binding interfaces 112 integrate secondary services 104 with cloud services instances 110. For example, a tenant of a PaaS may wish to connect the PaaS instance with an SaaS and/or a DBaaS from another provider rather than developing a similar application directly in the cloud environment. The binding interface may establish API endpoints between the cloud service instances and external, secondary services. An API endpoint may comprise one or more uniform resource locators (URLs) and/or one or more hypertext transfer protocol (HTTP) commands for communicating with a secondary service. In the context of binding a DBaaS, for instance, the API endpoint may include a URL and a set of HTTP messages for interacting with a DBaaS instance. For example, the HTTP messages may include embedded database commands for storing, retrieving, and modifying data in the DBaaS instance. The API endpoints, URLs, and HTTP commands may vary from one secondary service to another.

Data repository 120 stores data for one or more components of provisioning framework 130. Example data that may be stored may include, but is not limited to, service schematics 121, compiles schematics 122, engine metadata 123, and run lists 124. These datasets may be read and/or written by provisioning framework 130 to perform various provisioning operations as described further herein.

In one or more embodiments, data repository 120 is any type of storage unit and/or device (e.g., a file system, database, collection of tables, or any other storage mechanism) for storing data. Further, a data repository 104 may include multiple different storage units and/or devices. The multiple different storage units and/or devices may or may not be of the same type or located at the same physical site. Further, data repository 120 may be implemented or may execute on the same computing system as provisioning framework 130 Alternatively or additionally, data repository 120 may be implemented or executed on a computing system separate from provisioning framework 130. Data repository 120 may be communicatively coupled to provisioning framework 130 via a direct connection or via a network.

Provisioning framework 130 provides logic for defining and provisioning cloud service instances 110. Provisioning framework 130 generally comprises service schematic editor 131, service schematic compiler 132, provisioning engine 133, binding logic 134, service simulator 135, and control console 136. As previously the components of provisioning framework may be combined into one or distributed across multiple nodes.

Service schematic editor 131 includes logic for creating and editing service schematics. The editor may provide an interactive interface such as a GUI and text editor, that allows a user to perform operations for defining service schematics as described further herein. Service schematic editor 132 may save service schematics for one or more cloud services in data repository 120.

Service schematic compiler 132 compiles service schematics created using service schematic editor 131. Service schematic compiler 132 translates the service schematics into instructions that may be executed by provisioning engine 133. In one or more embodiments, service schematic compiler 132 translates the service schematics into a set of one or more config-lists or other configuration files. The configuration files may include CRUD instructions or any other type of configuration type instructions for allocating/deallocating cloud resources 102.

Provisioning engine 133 is configured to execute provisioning operations based on compiled service schematics. Example provisioning operations may include, but are not limited to (a) creating new instances of a cloud service; (b) updating current instances of a cloud service, including scaling up (i.e., allocating additional resources), scaling down (i.e., deallocating resources), and upgrading/modifying currently allocated resources; and (c) deleting instances of a cloud service. Provisioning engine 133 may leverage engine metadata 123 to execute provisioning operations as described further below.

In one or more embodiments, provisioning engine 133 generates run lists during provisioning operations. A run list in this context is a data object that captures runtime information about the progress of a provisioning operation. For example, a run list may map a sequence of sub-operations in a provisioning flow to a set of corresponding status indicators. Example status indicators may track whether the corresponding sub-operation completed successfully, failed, is currently pending, or has not been started. If a sub-operation fails, provisioning engine 133 may retry the operation and/or generate an alarm to notify a user.

Binding logic 134 is configured to generate binding interfaces (e.g., binding interfaces 112) for instances of a cloud service. In one or more embodiments, binding logic 134 includes instructions for establishing API endpoints with various compatible secondary services. For example, binding logic 134 may include API endpoint templates that define URLs and commands for interacting with other cloud services. Binding logic 134 may bind tenant-specific parameters in the API endpoint templates to establish an interface that binds the secondary service with an instance of the primary cloud service.

In one or more embodiments, binding logic 134 manages access credentials, such as usernames, passwords, digital certificates, authentication tokens, and/or authentication protocols, such as Open Authorization (OAuth) for accessing other cloud services. For example, a tenant may have previously subscribed to a DBaaS prior to creating a new instance of a PaaS. Binding logic 134 may acquire the tenant's access credentials for the DBaaS (e.g., by prompting the user) and store the credentials in association with an API endpoint. Binding logic 134 may further manage encryption of messages between cloud service instances 110 and secondary services 104. Example encryption protocols include, but are not limited to the RSA encryption and advanced encrypt standard (AES) protocols. Other encryption algorithms may also be used, depending on the particular binding interface.

Control console 136 provides an interface through which users 108 may access provisioning framework 130. Control console 136 may comprise, without limitation, a GUI, an API, a command-line interface (CLI), and/or some other interface for interacting with users. The users may submit commands through control console 136 to perform one or more of the operations described herein.

3. SERVICE SCHEMATIC DEFINITIONS

Service schematics 121 represents blueprints for one or more cloud services. As previously indicated, a service schematic may define a cloud service in a manner that is decoupled from environment-specific parameters, which may vary between different cloud environments. For example, cloud resources 102 may comprise a particular set of operating systems, storage servers, and/or other cloud resources. Service schematics 121 may be ported to a different environment where one or more of these resources (e.g., host operating systems, storage servers, etc. may be from different providers and configured differently). Service schematics 121 may be used to provision cloud service instances (e.g., PaaS instances, DBaaS instances) in the new environment even though the set of cloud resources may not completely overlap.

In one or more embodiments, service schematics 121 define cloud services using a declarative syntax. The declarative syntax that is used may describe what resources should be allocated for an instance of a cloud service but may not describe how to allocate the resources. Example declarative languages include, but are not limited to, the extensible markup language (XML) and JavaScript Object Notation (JSON). By using a declarative syntax, the determination of how resources are allocated may be left to provisioning engines executing in different environments.

In one or more embodiments, provisioning framework 130 maintains a set of one or more service schematic templates for guiding users 108 in the creation of service schematics. For example, a service schematic template may comprise a XML or JSON file that is pre-formatted according to a particular structure or pattern. In the context of an XML file, the service schematic may include a set of predefined tags, elements, and/or other markup constructs that users 108 may populate with cloud service attributes. Templates in other file formats may similarly include a set of structured constructs that may be populated with cloud service attributes using service schematic editor 131.

Figure 2:
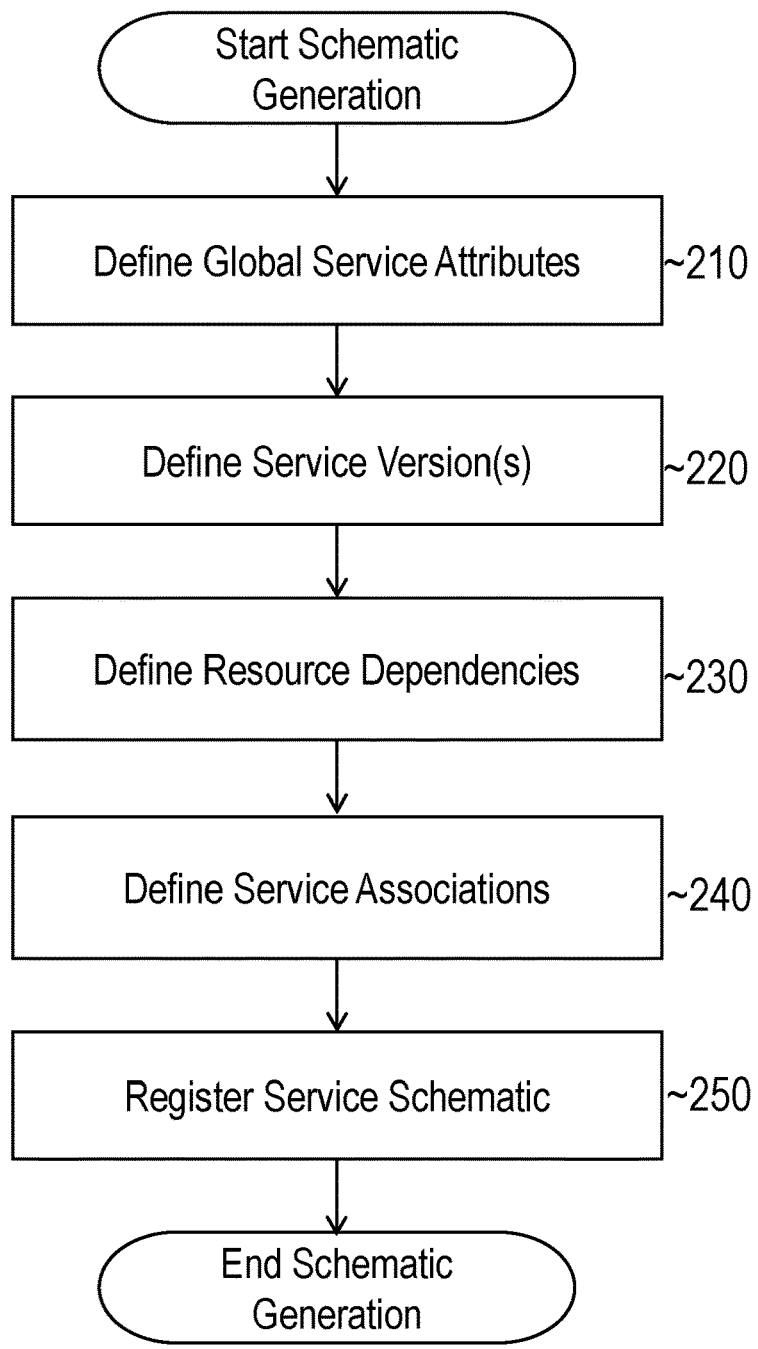
FIG. 2 illustrates an example set of operations for generating a cloud service schematic in accordance with one or more embodiments.

FIG. 2 illustrates an example set of operations for generating a cloud service schematic in accordance with one or more embodiments. The set of operations include defining a set of global service attributes (Operation 210). A global service attribute is a property or parameter of a service that is independent of and applicable to all versions of a service. Example global service attributes may include, but are not limited to (a) a name and/or unique identifier for the cloud service;" (b) an indication of whether the service is managed (e.g., the cloud provider maintains software resources) or unmanaged (e.g., the tenant is responsible for maintaining software resources; and (c) high-level parameter declarations (e.g., declarations of services and/or other resources that may be integrated into the primary cloud service).

Figure 3:
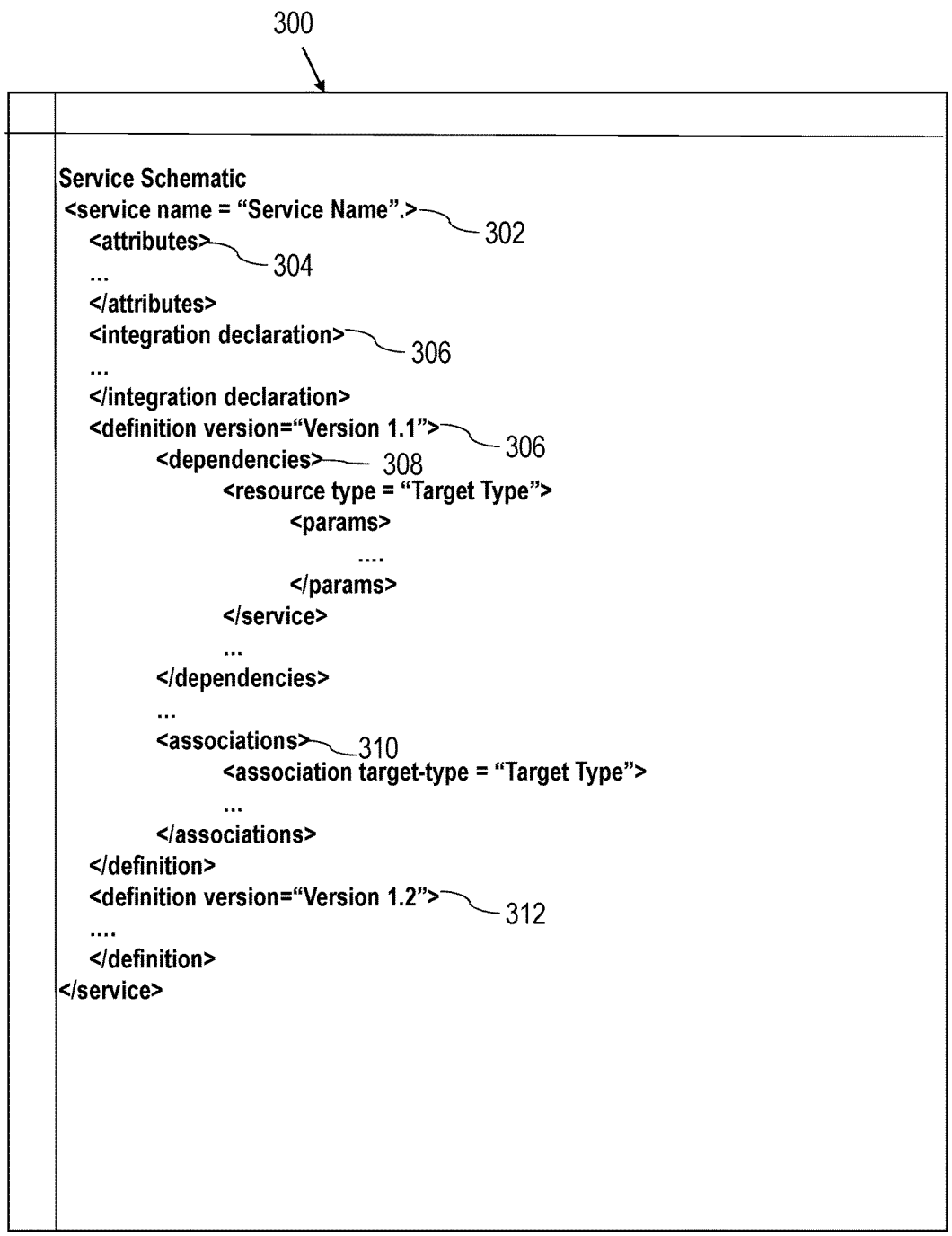
FIG. 3 illustrates an example cloud service schematic template in accordance with one or more embodiments.

FIG. 3 illustrates example cloud service schematic template 300 in accordance with one or more embodiments. Service schematic template 300 uses XML constructs to define a cloud service. As previously indicated, other formats, such as JSON, may also be used, depending on the particular implementation.

Service schematic template 300 includes schematic elements 302, 304, and 306 for defining global service attributes. Schematic element 302 corresponds to the root node in a hierarchical schematic structure and includes a field, "Service Name", for assigning a name to the cloud service. A user may access service schematic template 300 via service schematic editor 131 to populate the schematic elements and generate a new service schematic. For example, a user may assign a service name, dependencies, and associations as described further herein.

Schematic element 304 is a construct that captures one or more general service attributes. For example, the following declarative statement may be added, via schematic editor 131, to indicate that the cloud service is managed:

```
<attributes>
    <managed>true</managed>
</attributes>
```

Other attributes may also be added, depending on the particular implementation. Examples may include, but are not limited to, an indication of a cloud service type (PaaS, DBaaS, etc.), service-level agreement parameters (e.g., performance targets, constraints, etc.), and any other attributes for defining the cloud service.

Schematic element 306 is a construct for declaring components that are integrated in the service. The components may be further specified as resource dependencies, as discussed further below. The declaration section allows a user or compiler to quickly identify the resources that are associated with the cloud service without having to parse the entire schematic.

Referring again to FIG. 2, the process for generating a service schematic further comprises defining one or more service versions (Operation 220). As previously indicated, a cloud service may have multiple versions. In some cases, a service schematic may initially be defined with multiple versions. Additionally or alternatively, versions of a cloud service may be added to a service schematic over time. The same service schematic may be used to define multiple versions of a cloud service. Each version may be assigned a unique identifier within the service schematic. The unique identifier may be an alphanumeric value (e.g. "Version 1.0", "Version 1.1", "Version 1.2", etc.), an integer value (e.g., "1", "2", "3" etc.), or any other data type.

Schematic elements 306 and 312 of schematic template 300 may be used to define different versions of a cloud service. Each version element is associated with a different version identifiers (e.g., "Version 1.1", "Version 1.2", etc.). Each version element may further be associated with different resource dependencies, run lists and/or associations.

In one or more embodiments, the service schematic defines resource dependencies for each version of the service (Operation 230). A resource dependency may be defined as a function of a type of cloud resource on which an instance of a respective version of the cloud service depends. For example, a particular version of a cloud service versions may be dependent on a specific type of application or service. However, the particular version of the cloud service may not be dependent on a particular type of hardware platform or operating system on which the specific application or service is executed. In other cases, the particular version of the cloud service may be dependent on a particular type of hardware platform and/or operating system. In other cases, the dependencies may vary depending on the version of the cloud service.

Schematic element 308 may be used to define resource dependencies associated with the base version of a cloud service (e.g., "Version 1.1") Each dependency is defined by a resource type (e.g., <resource type="Java Cloud Service (JCS)">, <resource type="Database Server"> etc.) The resource types may be declared at a high level without any reference to a particular cloud target. For example, the dependency may not reference a particular host by hostname, internet protocol (IP) address, or other unique identifier. A provisioning engine may select the specific targets that are allocated at the time of provisioning.

A dependency may be associated with one or more parameters, which further define the scope of the dependency. In one or more embodiments, a parameter adds constraints or conditions on a particular type of resource. For example, a parameter may constrain a service to a particular version or platform. In the context of a JCS, for instance, the following parameters may be used to constrain the service to a particular type of application server (i.e., version 12.1.3 of a WebLogic application server):

```
<service type = "JCS">
    <params>
        <wls.version>12.1.3</wls.version>
    </params>
</service>
```

Other constraints and conditions may also be defined including, but not limited to, performance-based conditions (e.g., minimum memory bandwidth, minimum CPU performance, etc.) and platform-based constraints (e.g., OS type, hardware constraints, etc.). The available parameters may vary from resource to resource.

In one or more embodiments, the service schematic further defines associations for each version of the service (Operation 250). An association in this context corresponds to a service or other resource that is compatible with a version of the cloud service. Cloud services are not dependent on associated resources. As discussed further below, a provisioning engine integrates an associated resource with the primary cloud service if available. If the associated resources are not available, then a default cloud resource may be used as a fallback or no further action may be taken.

In one or more embodiments, service schematics are registered with provisioning framework 130 (Operation 250). The registration process may include validating, compiling, and/or simulating the service schematic as described further below. Upon registration, provisioning framework 130 may store registration data that maps provisioning requests for the cloud service to the corresponding service schematic.

4. SERVICE SCHEMATIC COMPILATION

Service schematic compiler 132 translates service schematics into a set of instructions for performing one or more provisioning operations. Example provisioning operations may include, but are not limited to:
- Allocating resources for new instances of a cloud service, such as when a new tenant subscribes to the cloud service;
- Scaling out an instance of a cloud service by adding additional resources and/or capacity to an existing instance of a cloud service;
- Scaling down an instance of a cloud service by deallocating resources supporting an instance of a cloud service;
- Upgrading an instance of a cloud service, such as when a tenant switches to a more recent version of the cloud service;
- Associating an instance of a cloud service with secondary services; and
- Deleting an instance of a cloud service.

In one or more embodiments, service schematic compiler 132 is configured to compile a service schematic into one or more configuration files (also referred to as a config files or config lists). A configuration file refers to a data object storing a list of instructions for configuring cloud resources 102. For example, a configuration list may include a list of CRUD instructions for creating new resource configurations, reading current configurations, updating resource configurations, and deleting resource configurations.

During compilation, a resource dependency may be mapped to one or more CRUD instructions. For example, a dependency on a JCS may be mapped to instructions for configuring an application server, a routing service, and/or one or more other resources that support the JCS. The configuration instructions may vary depending on the resource dependencies, associations and/or other elements of a cloud service schematic.

Figure 4:
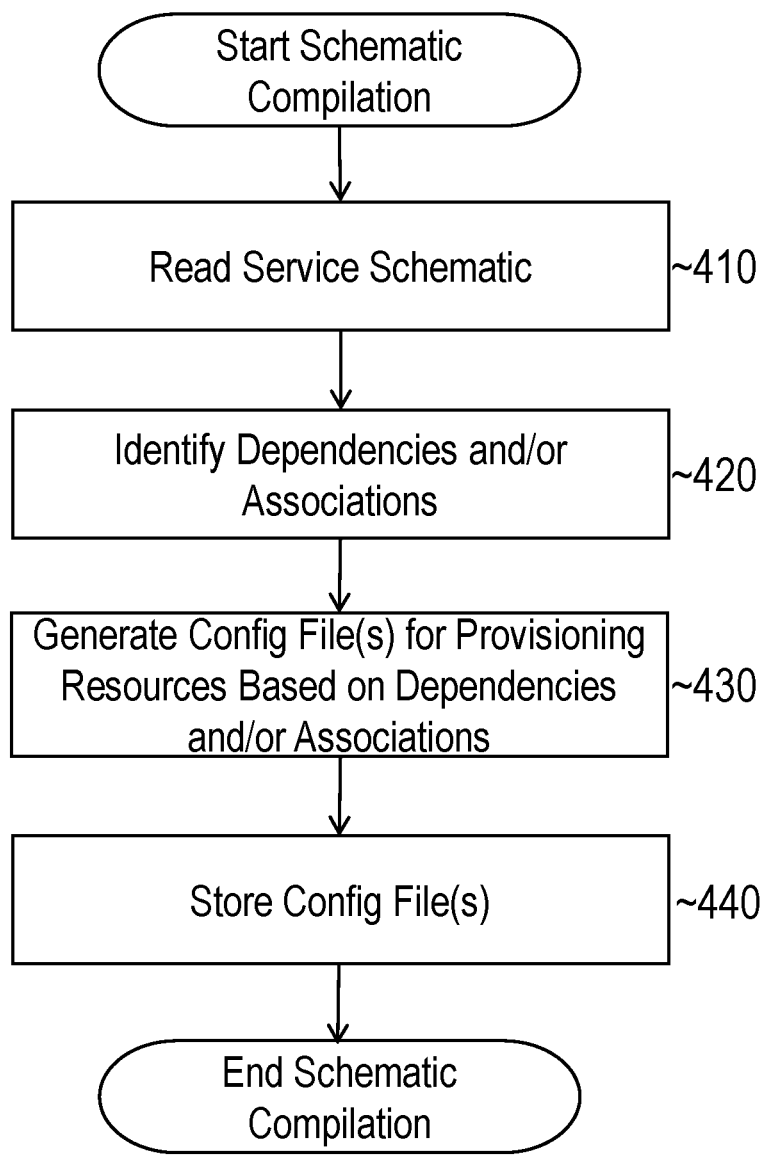
FIG. 4 illustrates an example set of operations for compiling a cloud service schematic in accordance with one or more embodiments.

FIG. 4 illustrates an example set of operations for compiling a cloud service schematic in accordance with one or more embodiments. The process includes reading a service schematic to compile from data repository 120 (Operation 410). The compilation process may be triggered upon request by a user. For example, a user may submit a request that a service schematic be compiled from a service schematic editor. In response, the service schematic compiler may be invoked to compile the service schematic that the user is currently viewing (e.g., via a GUI). In other cases, the compiler may be invoked automatically in response to a triggering event, such as detecting that a service schematic has been updated or that resources in a cloud environment have changed.

During the compilation process, service schematic compiler 132 parses the service schematic to identify resource dependencies and associations defined therein (Operation 420). In the context of an XML schematic, for example, service schematic compiler 132 may comprise an XML parser for identifying schematic elements (e.g., schematic elements 308 and 310), corresponding to dependency and association definitions. Service schematic compiler 132 may parse schematic element 308 to identify the resource dependencies and associated parameters, if any. Service schematic compiler 132 may parse schematic element 310 to identify if the cloud resource is compatible with any secondary service.

Based on the dependencies and/or associations identified from the service schematic, service schematic compiler 132 generates a set of one or more configuration files for provisioning cloud resources 102 (Operation 430). As previously indicated, the configuration files may include CRUD instructions that are executable by provisioning engine 133 to allocate/deallocate cloud resources.

In one or more embodiments, schematic compiler 132 generates separate configuration files for different types of configuration operations. For example, service schematic compiler 132 may generate one configuration file for provisioning a new instance of a cloud service, another for scaling out an instance of the cloud service, and another for associating secondary services.

Additionally or alternatively, different configuration files may be generated for different versions of a cloud service. For example, schematic compiler 132 may create a set of configuration files for "Versions 1.1" corresponding to schematic element 306 based on resources dependencies defined by schematic element 308 and associations defined by schematic element 310. Schematic compiler 132 may create a separate set of configuration files for "Version 1.2" corresponding to schematic element 312 based on resource dependencies and associations defined therein.

In one or more embodiments, schematic compiler 132 may perform one or more optimizations when mapping the service schematic to a set of configuration instructions. As one example, a configuration file may be executable to configure a virtual machine. This allows the configuration file to be ported to any environment in which the virtual machine is running. Further, during deletion of an instance of a cloud service, the entire virtual machine may be deleted rather than deleting individual resources.

In one or more embodiments, service schematic compiler 132 is configured to optimize the order of the configuration instructions. For example, service schematic compiler 132 may determine whether there are redundant or otherwise inefficient configuration instructions. If so, the instructions may be modified and/or reordered. For instance, an update operation of a resource may cause a subsequent configuration operation on the resource to be unsuccessful. To prevent an error, service schematic compiler 132 may push the update operation after the configuration operation in the portioning flow.

In one or more embodiments, service schematic compiler 132 stores the optimized configuration files in data repository 120 (Operation 450). The service schematic and registration data may be mapped to the optimized configuration file, which corresponds to a compiles version of the configuration schematic. Provisioning engine 133 may access the optimized configuration file to execute provisioning operation as described further below.

Figure 5:
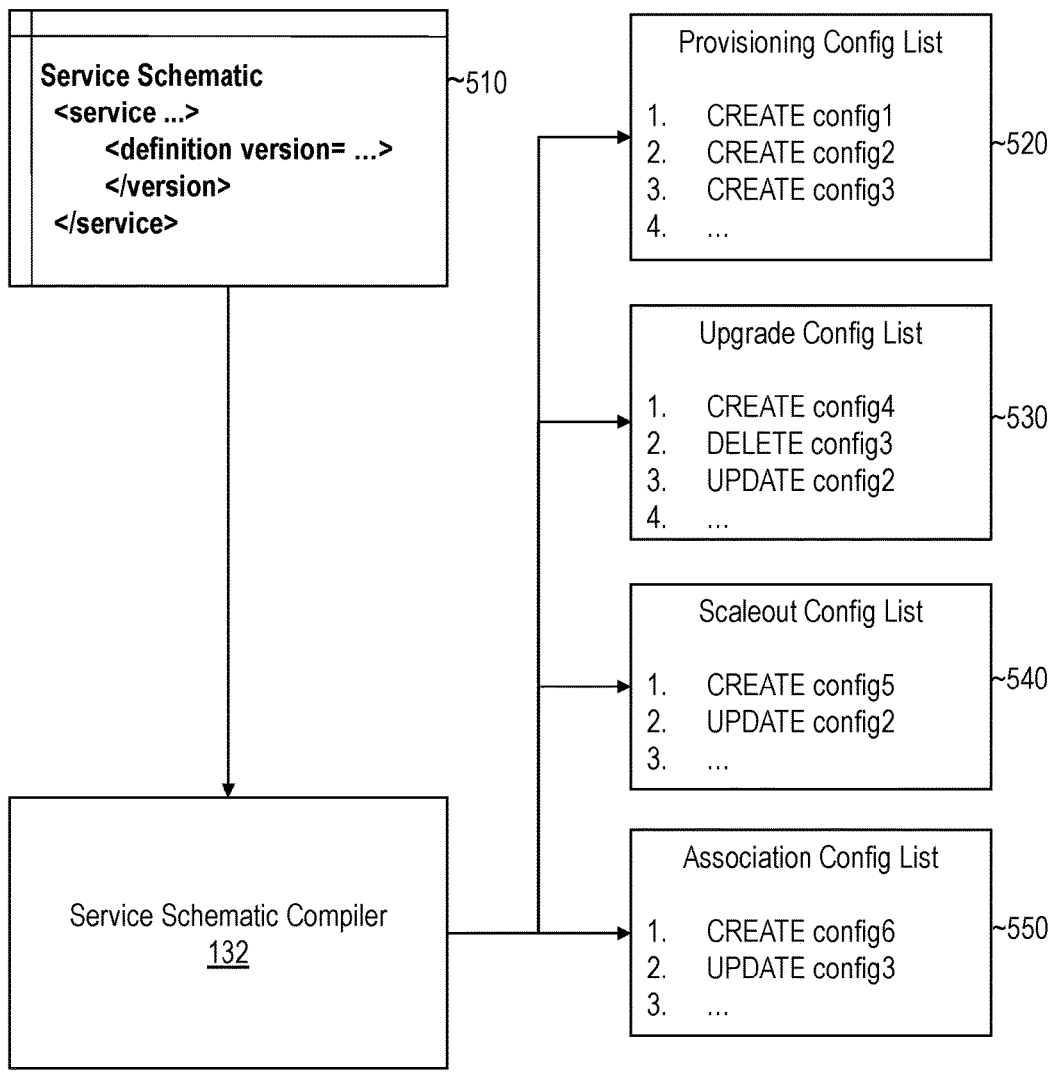
FIG. 5 illustrates an example output of a cloud service schematic compiler in accordance with one or more embodiments.

FIG. 5 illustrates an example output of a cloud service schematic compiler in accordance with one or more embodiments. Service schematic 132 receives, as input, service schematic 510, which defines a set of resource dependencies and associations. In response, service schematic compiler 132 generates a set of configuration lists. The configuration lists include provisioning config list 520 for provisioning new instances of the cloud service, upgrade config list 530 for upgrading instances of the cloud service, scaleout config list 540 for augmenting the performance/capacity of the cloud service, and association config list 550 for integrating secondary services.

5. VERSION AGGREGATION

As previously described, a service schematic may define a derived version of a cloud service as a function of one or more other versions of a cloud service, including a base version. For example, version 1.2, defined by schematic element 312, may inherit the dependencies and associations of version 1.1, which acts as the base version. In other words, the dependencies captured by schematic element 308 do not need to be redefined in version 1.2. Rather, these dependencies are automatically applied the version 1.2, excepting any changes made by the derived version.

A derived version of a cloud service may make changes to another version of a cloud resource by (a) adding a resource dependency and/or association; (b) modifying a resource dependency and/or association; and/or (c) removing a resource dependency and/or association. For example, version 1.1 of a service may include a dependency on a routing management service with a configuration type reference "RTaaS-Routing Management". Version 1.2 may change this dependency as follows:

```
<definition version="1.2" >
    <run-list>
        <config action="CREATE" config-type-ref="LBaaS-Routing
        Management"/>
        <config action="DELETE" config-type-ref="RTaaS-Routing
        Management"/>
    </run-list>
</definition>
```

In the above definition, version 1.2 replaces "RTaaS-Routing Management" with "LBaaS-Routing Management". The replacement is defined using a CRUD syntax, although other syntaxes may also be used, depending on the particular implementation. The CREATE configuration action adds the new dependency to version 1.2, and the DELETE configuration action removes a dependency defined in version 1.1.

A service schematic may define multiple derived versions of a cloud service. For example, version 1.3 may be defined as a function of version 1.2 and version 1.1. In this case, version 1.3 inherits the resource dependencies and associations of base version 1.1 as modified by version 1.2. Version 1.3 may make further modifications by adding, modifying, and/or removing dependencies/associations.

Base versions and derived versions of a cloud service may be compiled differently. A base version of the cloud service defines a base set of dependencies and/or associations (also referred to herein as "base properties"). The base version does not inherit dependencies and associations from other cloud service versions defined in the service schematic. During compilation, service schematic compiler 132 may generate the configuration files based on the base properties without incorporating any changes made by derived versions of a service. In other words, provisioning operations, including operations for provisioning new instances, scaling out, etc. include instructions for allocating resources based on the base set of resource dependencies and associations. The instructions are not computed as a function of other cloud service version defined in the service schematic.

For derived versions of a cloud service, service schematic compiler 132 may aggregate resource dependencies and/or associations across multiple versions of the cloud service. In one or more embodiments, aggregating resource dependencies comprises merging configuration actions across the current version of a cloud service and all previous versions of the cloud service. For example, if version 1.1 creates a new resource dependency, version 1.2 updates the dependency, and version 1.3 does not define a configuration action with respect to the dependency, then version 1.3 inherits the updated dependency as defined in version 1.2. On the other hand, if version 1.3 deletes the dependency, then the resource dependency is not included or may be removed during provisioning operations.

In one or more embodiments, service schematic compiler 132 is configured to detect and merge configurations that collide. A collision occurs when a configuration action in a current version of a cloud service is directed to a dependency or association defined in a previously defined version of the cloud service. TABLE 1 below illustrates the example result of merging colliding configuration actions.

TABLE 1

RESULTS OF MERGING CONFIGURATION ACTIONS

| Action on Previous Version | Action on Current Version | Merged/Aggregate Result |
|---|---|---|
| CREATE | CREATE | Error is raised to alert user of resource duplication |
| CREATE | UPDATE | Provisioning new instances will CREATE the updated version of the resource; upgrade operations will UPDATE the older version to the new version. |

TABLE 1-continued

RESULTS OF MERGING CONFIGURATION ACTIONS

| Action on Previous Version | Action on Current Version | Merged/Aggregate Result |
| --- | --- | --- |
| CREATE | DELETE | No action is taken when provisioning new instances; a DELETE may be performed during upgrade operations |
| DELETE | CREATE | A configuration is created per the current version even though a previous version deleted the resource |
| DELETE | READ/UPDATE/ DELETE | An error is generated to notify the user that the resource does not exist |

6. SCHEMATIC-BASED PROVISIONING

In one or more embodiments, provisioning engine 133 performs provisioning operations by executing compiled service schematics. Example types of provisioning operations may include, but are not limited to generating new instances of a cloud service, upgrading instances of a cloud service to a new version, expanding the capacity/resources allocated to an instance of a cloud service, scaling down/ reducing the resources allocated to an instance of a cloud service, and deleting an instance of a cloud services. Each type of provisioning operations may generally comprise allocating, upgrading, and/or deallocating resources for an instance of a cloud service.

In one or more embodiments, provisioning engine 133 allocates/deallocates cloud resources for a tenant using virtual machines (VMs). During a provisioning operation, provisioning engine 133 may execute a configuration file generated by service schematic compiler 132 to configure a VM for a tenant. For example, provisioning engine 133 may read a CREATE instruction from a configuration file to allocate a database resource for an instance of a cloud system. Based on the CREATE instruction, provisioning engine 133 may reserve an instance of the database resource for the VM. Provisioning engine. Additionally or alternatively, provisioning engine 133 may reserve other resources (e.g., CPU resources, network resources, etc.) for the VM.

In one or more embodiments, provisioning engine 133 allocates/deallocates cloud resources for a tenant based on a service topology. A service topology in this context defines dependencies between different cloud resources. For example, a cloud resource, such as an instance of an SaaS application, may be dependent on a database service to manage database transactions. The cloud resource may further be dependent on a load balancer to route requests received over a network. Topology information may be captured by a service schematic and included in the compiled configuration files. During provisioning, provisioning engine 133 may connect interdependent cloud resources based on the configuration files. In the above example, for instance, provisioning engine 133 may reserve an instance of the SaaS application and the database service to a VM such that database requests from the application instance are routed to the instance of the database service.

Figure 6:
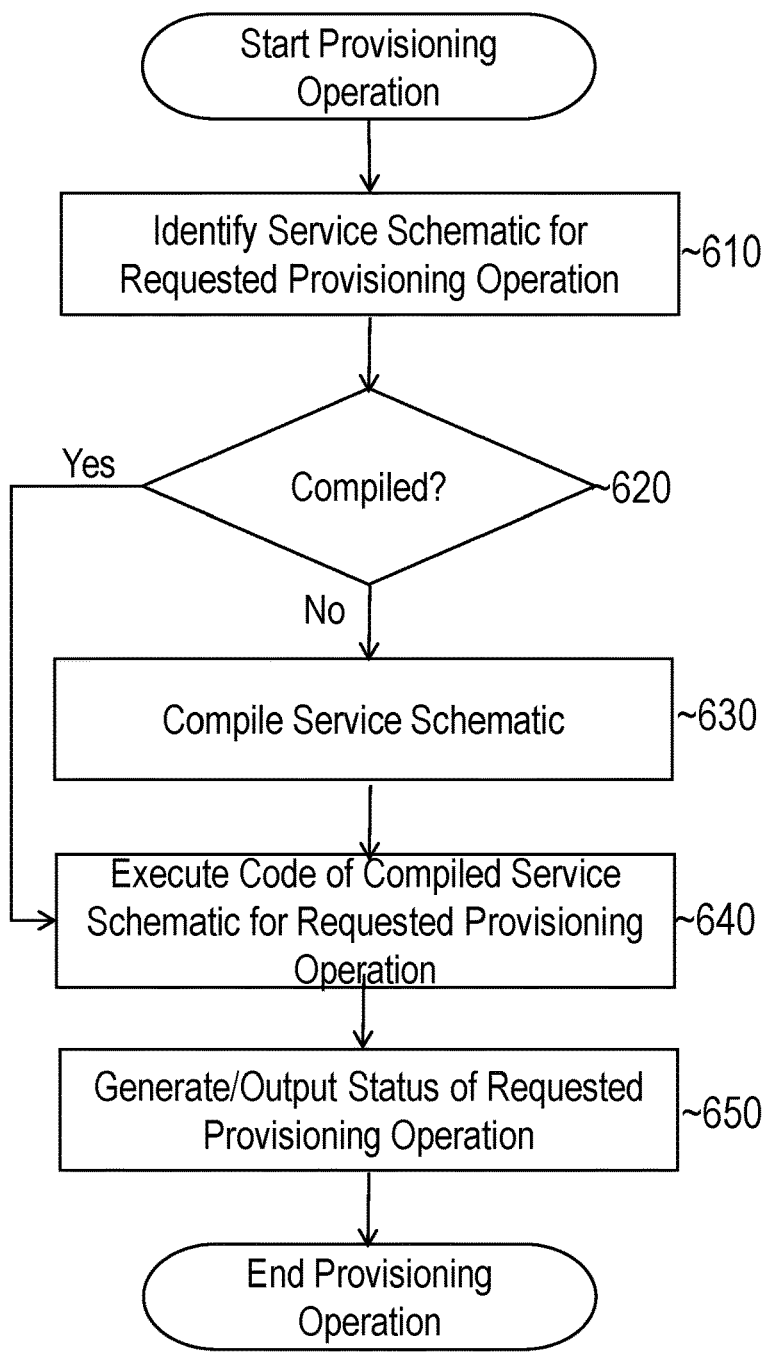
FIG. 6 illustrates an example set of operations for performing cloud provisioning in accordance with one or more embodiments.

FIG. 6 illustrates an example set of operations for performing cloud provisioning in accordance with one or more embodiments. The process may be triggered by receiving a request to perform a provisioning operation. For example, a cloud administrator, tenant, application, or other user may submit a request to create, upgrade, scale out, scale down, or delete an instance of the cloud service.

Responsive to receiving a request, provisioning framework 130 identifies a service schematic for the requested provisioning operation (Operation 610). For example, provisioning framework 130 may search the registration data using the cloud service name and/or any other unique identifier of the cloud service. The registration data may be mapped to a corresponding service schematic and a set of configuration files if the service schematic has been compiled.

In one or more embodiments, provisioning framework 130 determines whether the identified service schematic has been compiled (Operation 620). If the service schematic has not been compiled or has been updated since it was last compiled, then service schematic compiler 132 compiles (or recompiles) the service schematic (Operation 630).

Provisioning engine 133 next executes the code of the compiled service schematic for the requested provisioning operation (Operation 640). As previously described, service schematic compiler 132 may generate multiple configuration files for a single service schematic. If a user requests a new instance, provisioning engine 133 may access a corresponding configuration file to allocate resources for a new instance of the cloud service. If a user requests another provisioning operation (e.g., an upgrade, scale out, etc.), then provisioning engine 133 may access and execute the instruction included in another configuration that corresponds to the requested operation. Thus, provisioning engine 133 may select the configuration file/code to execute based on the type of provisioning operation requested.

Provisioning engine 133 may also execute code based on the version of the service that is the subject of the request. For example, a user may submit a request to upgrade an instance of a cloud service to the latest version. In response, provision engine 133 may select the upgrade configuration file for the latest version. As previously described, the configuration file may aggregate resource dependencies and associations across multiple versions of a cloud service.

In one or more embodiments, provisioning engine 133 performs provisioning operations based in part on engine metadata 123. Engine metadata 123 may include, without limitation, API framework provider information, config-type definitions, and cloud resource interface definitions. For example, engine metadata 123 may use the following template to capture details to establish an endpoint with a resource:

```
<definition type="RESOURCE_TYPE" >
    <url >${RESOURCE_URL}</url>
    <user>${RESOURCE_USER}</user>
    <pwd>${RESOURCE_PASSWORD}</pwd>
    <description>Provider for resource endpoints</description>
</definition>
```

The details include a URL, a username, and a password to access the resource. During provisioning operations that access resources of type "RESOURCE TYPE", provisioning engine 133 may access the resource definition in the engine metadata. Provisioning engine 133 may configure the resource using the URL, username, and password. The resource template above includes XML elements for defining resource parameters. However, any other metadata syntax may be used, including, without limitation, JSON. Additionally or alternatively, the definition may include additional fields (e.g., fields defining encryption, API, and/or messaging protocols) and/or omit one or more fields depending on the particular implementation.

In one or more embodiments, provisioning engine 133 generates a run list that tracks the status of a requested provisioning operation (Operation 650). For example, a run list may comprise a sequence of configuration actions, such as the CRUD instructions included a configuration file. During the provisioning operation, provisioning engine 133 executes the sequence of configuration actions to configure cloud resources 102 for an instance of a cloud service. The run list may map each configuration action to a corresponding status identifier. Example status identifier may include, but are not limited to, pending, currently in progress, success, and failure. A run list may be persistently stored and/or displayed to a user to track the overall progress of a provisioning operation.

In one or more embodiments, provisioning engine 133 is configured to reattempt a configuration action if the configuration action has failed. For example, a provisioning engine 133 may be unable to allocate a resource to a tenant due to resource overload or some other conflict. The provisioning engine 133 may wait for a threshold period of time and reattempt the configuration action. If provisioning engine 133 is unable to successfully complete the configuration action after a threshold number of tries or period of time, a notification may be sent to an administrator and/or the run list may be updated accordingly.

In one or more embodiments, a provisioning operation may be paused and resumed at a later time. When a provisioning operation is paused, the run list may be persistently stored in the current state at the time the operation is paused. In response to a request to resume the provisioning operation, provisioning engine 133 may access the run list from persistent storage to determine where the operation was paused. Provisioning engine 133 may then resume the operation by executing the next configuration action from where the operation was paused.

Figure 7:
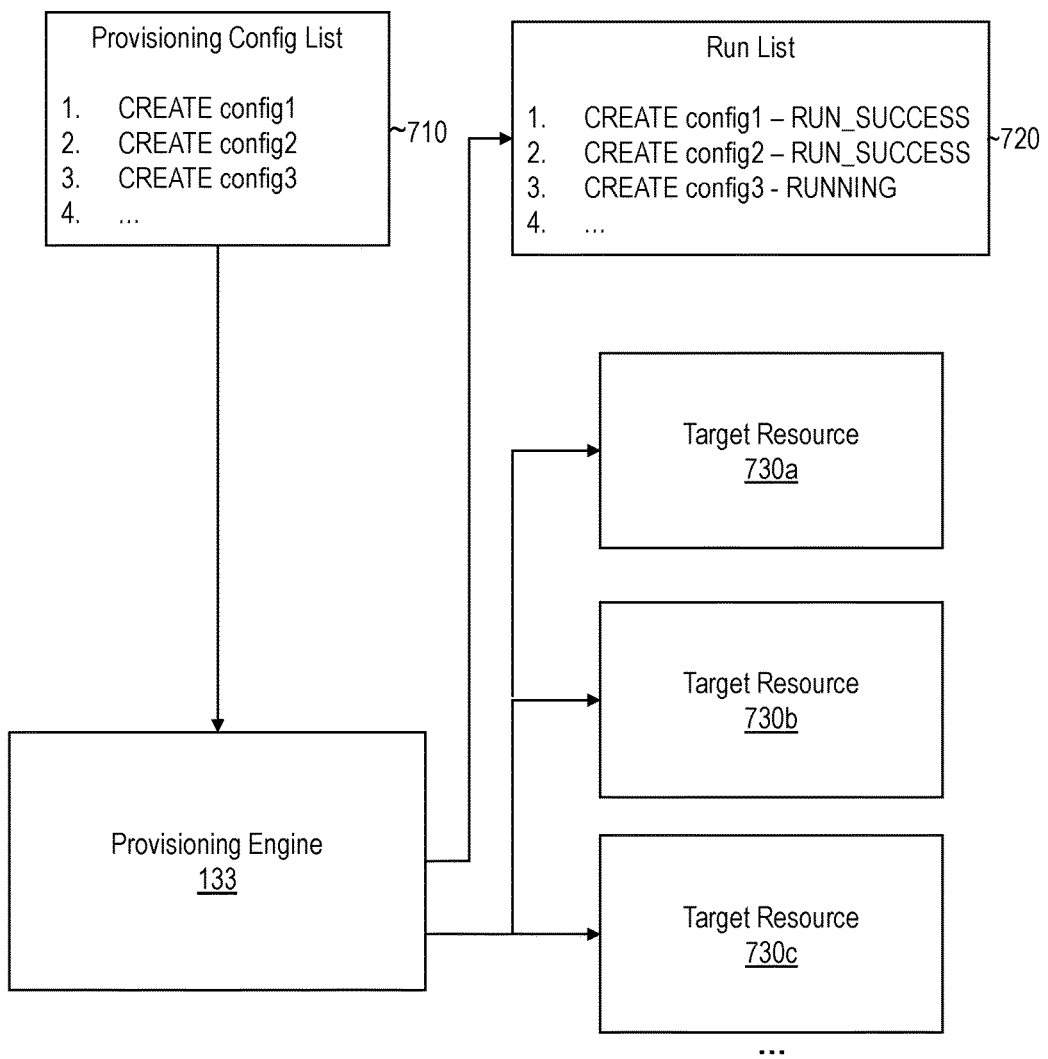
FIG. 7 illustrates an example implementation of a provisioning engine in accordance with one or more embodiments.

FIG. 7 illustrates an example implementation of a provisioning engine 133 in accordance with one or more embodiments. Provisioning 133 reads provisioning config list 710 to provision a new instance of a cloud service. Provisioning engine 133 executes the instructions in the config list to allocate target resources, such as target resources 730*a-c*, for the cloud service instance. Provisioning engine 133 further generates run list 720, which tracks the status of each configuration action in config list 710. In the example illustrated, the first two configuration actions completed successfully, and the third action is currently running.

7. SECONDARY SERVICE BINDING

In one or more embodiments, binding logic 134 is configured to integrate secondary services with a primary service. When a service schematic defines an association with a secondary service, binding logic 134 may bind the service to an instance of the primary service. Once the binding occurs, the instance of the primary service may access the methods and/or other functions of the secondary service.

Figure 8:
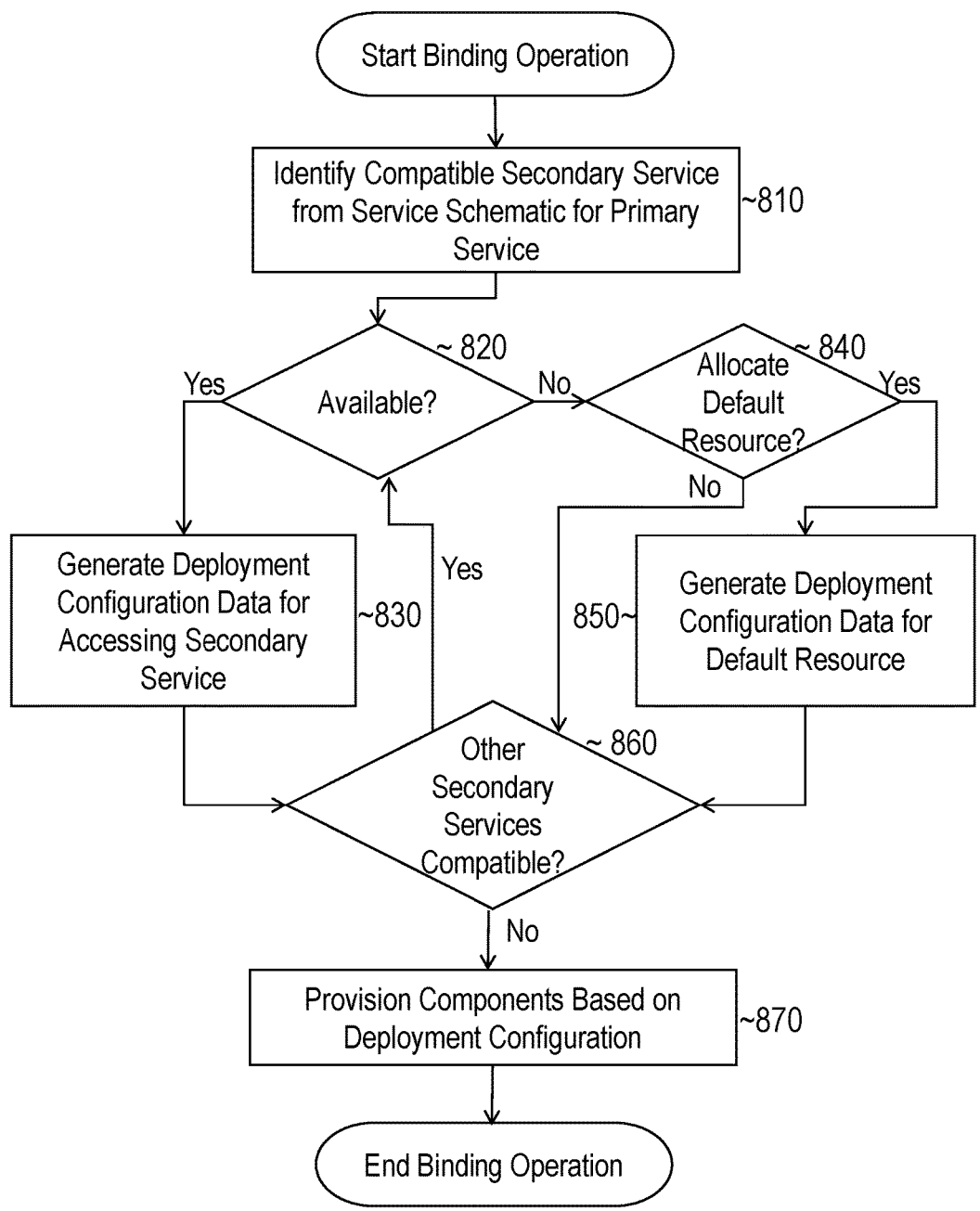
FIG. 8 illustrates an example set of operations for binding secondary services to a primary cloud service in accordance with one or more embodiments.

FIG. 8 illustrates an example set of operations for binding secondary services to a primary cloud service in accordance with one or more embodiments. The process includes identifying a compatible secondary service from a service schematic for a primary service (Operation 810). For example, service schematic compiler 132 may parse a service schematic to identify element 310, which defines one or more associations with secondary services. Element 310 may define a unique identifier for the secondary service, such as a service name and/or a URL where the service may be accessed.

During a binding operation, binding logic 134 may determine whether the secondary service is available (Operation 820). In one or more embodiments, binding logic 134 determines whether the secondary service is available based on whether the tenant of the primary cloud service has an account and/or credentials to access the secondary service. For example, binding logic 134 may determine whether or not the tenant has subscribed to the secondary service by prompting the tenant through a GUI or other interface. If the tenant has subscribed, binding logic 134 may prompt the tenant for a username, password, and/or other authentication credentials for accessing the secondary service. If the tenant cannot be authenticated with the second service, then binding logic 134 may determine that the secondary service is not available.

If the service is available, then binding logic 134 generates a set of deployment configuration data for accessing the secondary service (Operation 830). In one or more embodiments, the deployment configuration data binds a component of the primary service with the secondary service. Once configured, the component of the primary service may invoke or otherwise access methods in the second service. For example, an application instance of the primary service may be configured to invoke methods of a secondary DBaaS and/or SaaS.

In one or more embodiments, the deployment configuration data establishes an API endpoint and/or other interface to access the secondary service. Binding logic 134 may establish the API endpoint and/or other interface in the primary service by binding a service object, an authentication token, access credentials, and/or other data associated with a secondary data with deployment configuration code. For example, binding logic 134 may update the deployment configuration code with tenant-specific parameters and/or objects to establish a connection between a primary service component and a secondary service instance.

If the secondary service is not available, then binding logic 134 determines whether to allocate a default resource (Operation 840). In some cases, a default component may be specified by the service schematic. For example, the service schematic may specify a default storage component if a secondary storage service is not available. In other cases, binding logic 134 may automatically select the default storage component even if not defined in the service schematic. Alternatively, binding logic 134 may proceed performing any default deployment configurations if the secondary service is not available.

In one or more embodiments, binding logic 134 generates deployment configuration data for a default resource if the secondary service is not available (Operation 850). For example, if the tenant has not subscribed to one of secondary services 104 that are compatible with a corresponding cloud service instance, then binding logic 134 may generate a set of configuration actions for allocating one or more of cloud resources 102 instead. In some cases, the allocated resources may perform at least a subset of the functions of the compatible secondary service. For example, if a secondary DBaaS instance is not available, then a default database server may be used instead. The default database server may provide basic database storage functions but may not have the same analytical capacity as the secondary DBaaS.

The process further includes determining whether there are other secondary services that are compatible with the primary service (Operation 860). If so, then the process returns to operation 820 and repeats for the next compatible secondary service.

In one or more embodiments, provisioning engine 133 provisions a set of components based on the deployment configuration data generated for each compatible secondary service (Operation 870). As previously indicated, the deployment configuration data may comprise one or more configuration actions to establish an API endpoint or other interface to connect one or more of cloud resources 102 with one or more instances of secondary services 104. Provisioning engine 133 may execute the configuration instructions to establish a connection between the primary service instance and the one or more secondary service instances. For example, the components of the primary service may use a tenant's access credentials and/or other authentication tokens to invoke functions provided by the secondary service.

8. SERVICE SIMULATION

In one or more embodiments, service simulator 135 is configured to simulate cloud service instances defined through a cloud service schematic. Service simulator 135 allows new and updated cloud service schematic designs to be validated before the cloud service is released.

In one or more embodiments, service simulator 135 may simulate a new instance of a cloud service by compiling the service schematic and provisioning resources from a test environment. During the simulation, service simulator 135 may track data to help validate the design of the cloud service. Example data that may be tracked may include, but is not limited to, (a) topology data that identifies dependencies between different cloud resources and (b) performance data that tracks performance for individual and groups of resources (e.g., CPU performance, memory bandwidth, etc.)

Figure 9:
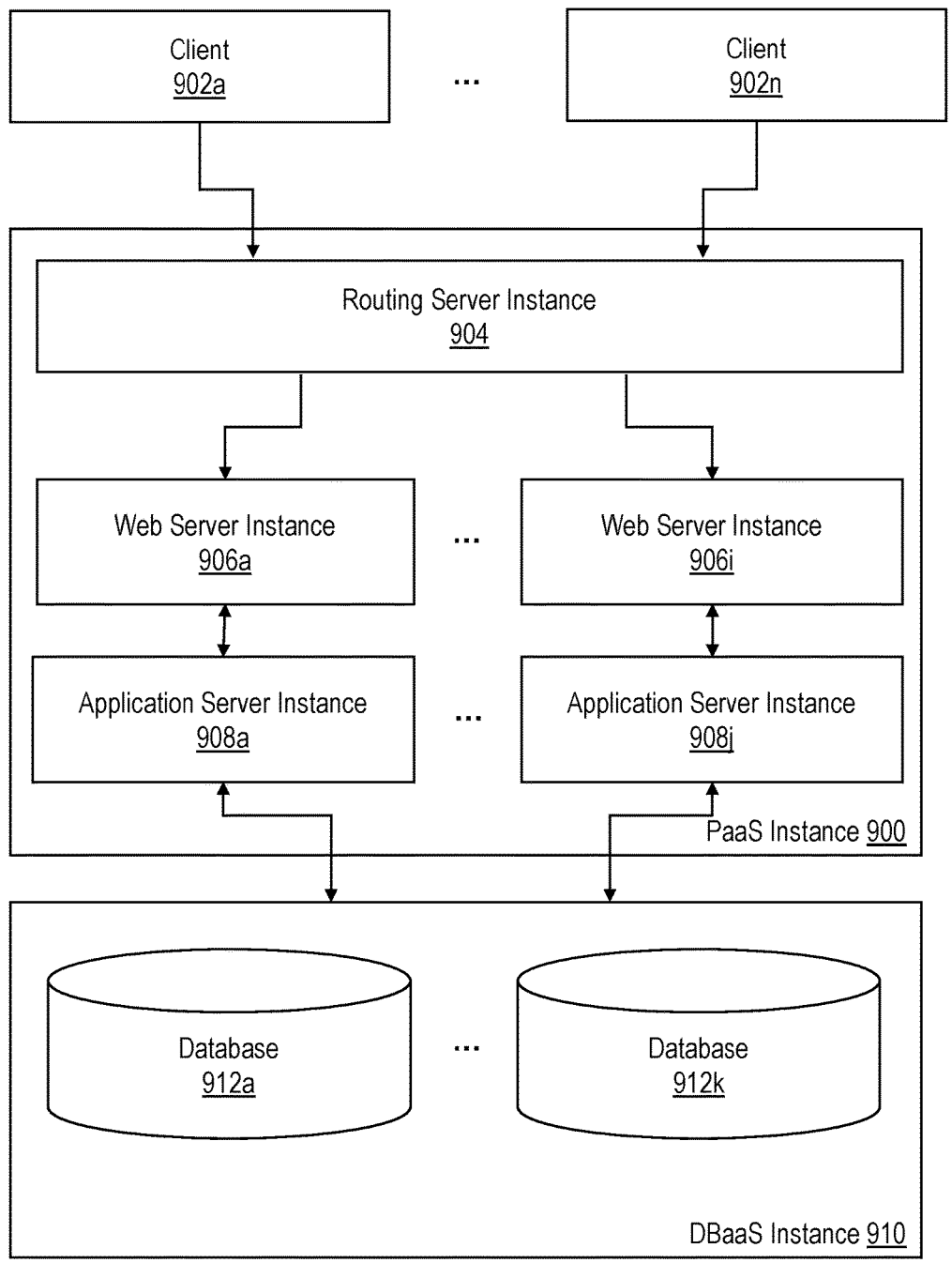
FIG. 9 illustrates an example service topology with a secondary service binding to a primary cloud service in accordance with one or more embodiments.

In one or more embodiments, service simulator 135 may generate a topology diagram for a simulated cloud service. The topology diagram may show dependencies between different cloud resources and how the resources connect. For example, FIG. 9 illustrates an example service topology with a secondary service binding to a primary cloud service in accordance with one or more embodiments. The service topology includes PaaS Instance 900, corresponding to a primary service. PaaS Instance 900 generally comprises routing service 904, web server instances 906a-i and application server instances 908a-j. Routing service 904 routes HTTP requests received from clients 902a-n to web server instances 906a-i. Web server instances 906a-i are configured to process HTTP requests and call functions provided by application server instances 908-j.

The service topology further includes DBaaS instance 910, which corresponds to a secondary service that is bound to PaaS instance 900. Application servicer instances 908a-j are configured to connect with DBaaS instances 910 to access database 912a-k and compatible functions provided through the secondary service. For example, application server instances 908a-j may invoke functions of DBaaS instance to store, retrieve, and run analytical queries on the data stored in databases 912a-k.

The service topology depicted in FIG. 9 is an example of topology diagram that may be generated and displayed by service simulator 135. The topology of a cloud service may vary from service schematic to service schematic.

9. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
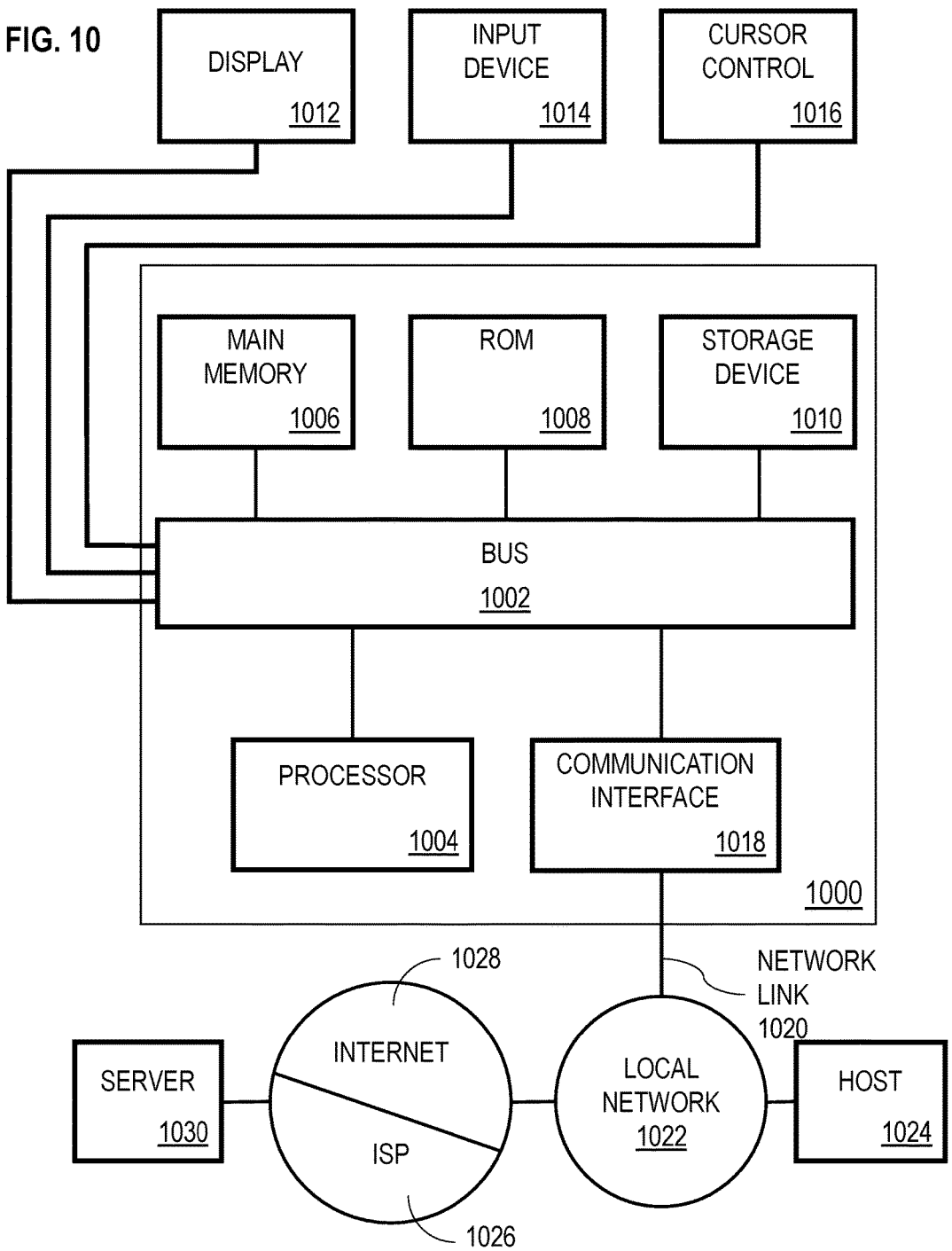
FIG. 10 illustrates an example computer system upon which one or more embodiments may be implemented.

For example, FIG. 10 is a block diagram that illustrates computer system 1000 upon which one or more embodiments may be implemented. Computer system 1000 includes bus 1002 or other communication mechanism for communicating information, and hardware processor 1004 coupled with bus 1002 for processing information. Hardware processor 1004 may be, for example, a general purpose microprocessor.

Computer system 1000 also includes main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes read only memory (ROM) 1008 or other static storage device coupled to bus 1002 for storing static information and instructions for processor 1004. Storage device 1010, such as a magnetic disk or optical disk, is provided and coupled to bus 1002 for storing information and instructions.

Computer system 1000 may be coupled via bus 1002 to display 1012, such as a cathode ray tube (CRT), liquid crystal display (LCD), or light-emitting diode (LED), for displaying information to a computer user. Input device 1014, which may include physical and/or touchscreen based alphanumeric keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010.

Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to host computer 1024 or to data equipment operated by Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

9. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions which, when executed by one or more hardware processors, cause operations comprising:
    storing, in at least one of volatile or non-volatile storage, a service definition for a primary service;
    wherein the service definition specifies a set of secondary services that are compatible with the primary service and a set of default components to use if the set of secondary services that are compatible with the primary service are not available;
    receiving, from a requesting entity, a request to perform a provisioning operation for an instance of the primary service;
    in response to receiving the request to perform the provisioning operation for the instance of the primary service:
        identifying, from the set of secondary services that are compatible with the primary service as specified by the service definition, a first subset of one or more secondary services that are available to the requesting entity and a second subset of one or more secondary services that are not available to the requesting entity;
        generating a deployment configuration for the instance of the primary service that binds the first subset of one or more secondary services to the primary service and configures a subset of one or more default components for the second subset of one or more secondary services that are not available to the requesting entity;

provisioning, based on the deployment configuration, a set of components for the instance of the primary service including the subset of one or more default components for the second subset of one or more secondary services that are not available to the requesting entity.

2. The one or more non-transitory computer-readable media of claim 1, wherein instructions for identifying, from the set of secondary services that are compatible with the primary service as specified by the service definition, the first subset of one or more secondary services that are available to the requesting entity comprises instructions for determining that the requesting entity has accounts with each secondary service of the first subset of one or more secondary services.

3. The one or more non-transitory computer-readable media of claim 1, wherein instructions for generating the deployment configuration for the instance of the primary service comprises instructions for generating a set of instructions that grants access to at least one component in the set of components to access the first subset of one or more secondary services.

4. The one or more non-transitory computer-readable media of claim 1, wherein instructions for provisioning, based on the deployment configuration, the set of components for the instance of the primary service comprises instructions for establishing a connection between at least one component in the set of components and a particular secondary service in the first subset of one or more secondary services.

5. The one or more non-transitory computer-readable media of claim 4, wherein the at least one component is configured to have access to a set of credentials for establishing the connection with the particular secondary service in the first subset of one or more secondary services.

6. The one or more non-transitory computer-readable media of claim 4, wherein the at least one component is configured to interact with an application programming interface (API) endpoint to access the particular secondary service in the first subset of one or more secondary services.

7. The one or more non-transitory computer-readable media of claim 1, wherein the set of secondary services that are compatible with the primary service are defined in at least one of an extensible markup language (XML) or a Javascript Object Notation (JSON) format using a first tag.

8. The one or more non-transitory computer-readable media of claim 7, wherein the service definition defines a different set of services on which the primary service is dependent using a second tag, the second tag different than the first tag.

9. The one or more non-transitory computer-readable media of claim 1, wherein the service definition defines the set of secondary services for a first version of the primary service; wherein the service definition defines a second set of secondary services for a second version of the primary service; wherein the second set of secondary service includes at least one secondary service that is not included in the set of secondary services for the first version of the primary service.

10. The one or more non-transitory computer-readable media of claim 9, wherein the at least one secondary service is not compatible with the first version of the primary service.

11. The one or more non-transitory computer-readable media of claim 9, the instructions further causing operations comprising receiving a request to upgrade from the first version of the primary service to the second version of the primary service; responsive to receiving the request to upgrade from the first version of the primary service to the second version of the primary service, replacing at least one secondary service in the first subset of one or more secondary services with a secondary service in the second set of one or more secondary services.

12. The one or more non-transitory computer-readable media of claim 1, wherein the first subset of one or more secondary services includes at least one of a database-as-a-service or an application-as-a-service.

13. The one or more non-transitory computer-readable media of claim 12, wherein the primary service is a platform-as-a-service, wherein instructions for provisioning, based on the deployment configuration, the set of components for the instance of the primary service comprises integrating the at least one of the database-as-a-service or the application-as-a-service into the platform-as-a-service.

14. The one or more non-transitory computer-readable media of claim 1, wherein the set of secondary services that a compatible with the primary service includes a database-as-a-service and wherein the instructions further cause operations comprising selecting a default storage component to store data if the database-as-a-service is not available.

15. The one or more non-transitory computer-readable media of claim 1, the instructions further comprising after provisioning the set of components for the instance of the primary service, determining that a particular secondary service in the first subset of one or more secondary services has become unavailable; in response to determining that the particular secondary service in the first subset of one or more secondary services has become unavailable, determining, based on the service definition, a particular set of one or more default components to replace the particular secondary service; and provisioning the particular set of one or more default components for the instance of the primary service.

16. The one or more non-transitory computer-readable media of claim 1, the instructions further comprising after provisioning the set of components for the instance of the primary service, determining that a particular secondary service in the second subset of one or more secondary services has become available, wherein the particular secondary service was not previously available in the first subset of one or more secondary services; in response to determining that the particular secondary service has become available, determining, based on the service definition, a particular set of one or more default components to replace using particular secondary service; and provisioning a set of one or more service components to replace the particular set of one or more default component, wherein the set of one or more service components are configured to access the particular secondary service using at least one application programming interface (API) endpoint.

17. The one or more non-transitory computer-readable media of claim 1, the instructions further comprising generating a topology diagram that shows dependencies between the set of components for the instance of the primary service; and displaying the topology diagram for the instance of the primary service.

18. The one or more non-transitory computer-readable media of claim 17, wherein the topology diagram identifies a dependency between a particular secondary service in the first subset of one or more secondary services.

19. A system comprising:
one or more hardware processors;
one or more non-transitory computer-readable media storing code, which, when executed by the one or more hardware processors cause operations comprising:
storing, in at least one of volatile or non-volatile storage, a service definition for a primary service;
wherein the service definition specifies a set of secondary services that are compatible with the primary service and a set of default components to use if the set of secondary services that are compatible with the primary service are not available;
receiving, from a requesting entity, a request to perform a provisioning operation for an instance of the primary service;
in response to receiving the request to perform the provisioning operation for the instance of the primary service:
identifying, from the set of secondary services that are compatible with the primary service as specified by the service definition, a first subset of one or more secondary services that are available to the requesting entity and a second subset of one or more secondary services that are not available to the requesting entity;
generating a deployment configuration for the instance of the primary service that binds the first subset of one or more secondary services to the primary service and configures a subset of one or more default components for the second subset of one or more secondary services that are not available to the requesting entity;
provisioning, based on the deployment configuration, a set of components for the instance of the primary service including the subset of one or more default components for the second subset of one or more secondary services that are not available to the requesting entity.

20. A method comprising
storing, in at least one of volatile or non-volatile storage, a service definition for a primary service;
wherein the service definition specifies a set of secondary services that are compatible with the primary service and a set of default components to use if the set of secondary services that are compatible with the primary service are not available;
receiving, from a requesting entity, a request to perform a provisioning operation for an instance of the primary service;
in response to receiving the request to perform the provisioning operation for the instance of the primary service:
identifying, from the set of secondary services that are compatible with the primary service as specified by the service definition, a first subset of one or more secondary services that are available to the requesting entity and a second subset of one or more secondary services that are not available to the requesting entity;
generating a deployment configuration for the instance of the primary service that binds the first subset of one or more secondary services to the primary service and configures a subset of one or more default components for the second subset of one or more secondary services that are not available to the requesting entity;
provisioning, based on the deployment configuration, a set of components for the instance of the primary service including the subset of one or more default components for the second subset of one or more secondary services that are not available to the requesting entity.

* * * * *